Figure 1:
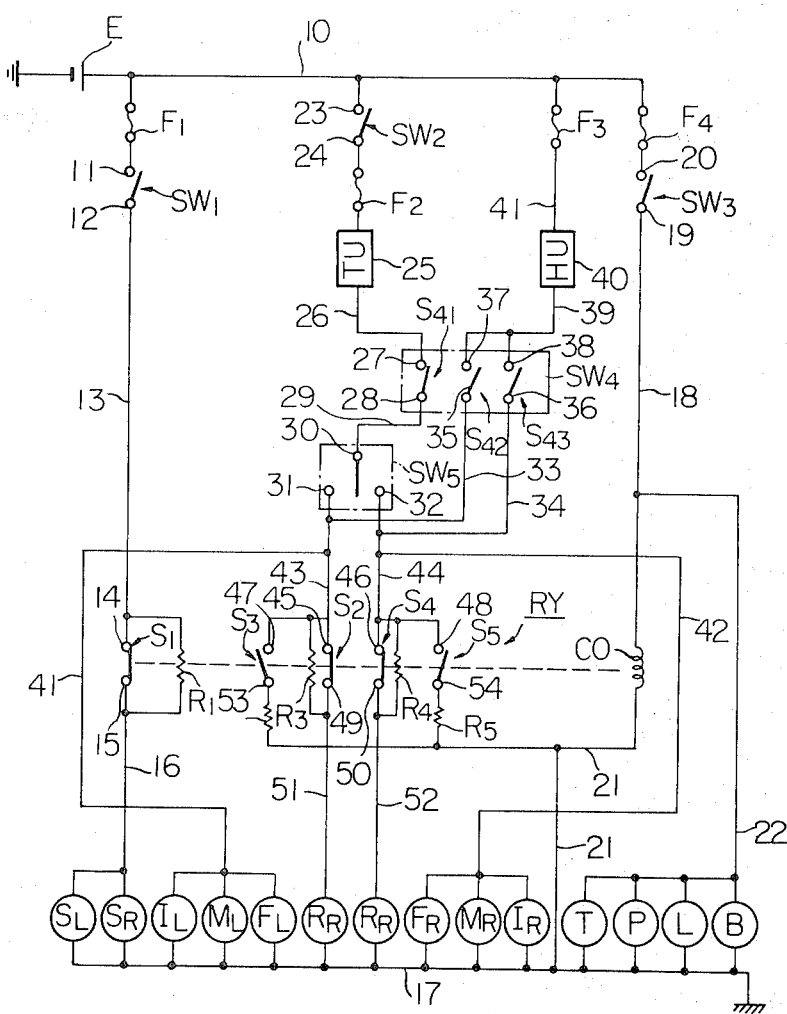

United States Patent [19]
Mogi

[11] 3,821,702
[45] June 28, 1974

[54] LIGHTING SYSTEM FOR CONTROLLING LIGHTS OF MOTOR VEHICLE TO GLOW IN A REDUCED LUMINOUS INTENSITY DURING THE NIGHTTIME

[75] Inventor: Takaaki Mogi, Fujisawa City, Japan

[73] Assignee: Nissan Motor Company, Limited, Yokohama City, Japan

[22] Filed: Feb. 22, 1972

[21] Appl. No.: 227,981

[30] Foreign Application Priority Data
May 22, 1971 Japan ............................. 46-41765
June 30, 1971 Japan ............................. 46-56980

[52] U.S. Cl. ............................. 340/81 R, 340/74
[51] Int. Cl. ............................. B60q 1/38, G08b 5/36
[58] Field of Search ............. 315/77, 82, 83; 340/74, 340/67, 81 R

[56] References Cited
UNITED STATES PATENTS

| 2,731,584 | 1/1956 | Onksen | 340/67 X |
| 3,148,306 | 9/1964 | Onksen | 340/67 X |
| 3,267,426 | 8/1966 | Parkes | 340/81 R |
| 3,277,442 | 10/1966 | Kearney | 340/84 |
| 3,548,251 | 12/1970 | Carbary | 315/77 |
| 3,603,840 | 9/1971 | Du Rocher | 315/82 |

FOREIGN PATENTS OR APPLICATIONS

| 1,955,270 | 5/1971 | Germany | 340/81 R |
| 1,325,719 | 3/1963 | France | 340/74 |
| 975,562 | 11/1964 | Great Britain | 340/81 R |

OTHER PUBLICATIONS
German printed application 1,923,507, 1-1971, – Westfalische Metall Industrie KG., 340-81R Primary Examiner—John W. Caldwell
Assistant Examiner—Marshall M. Curtis

[57] ABSTRACT

A lighting system for lighting various lamps installed in a motor vehicle, comprising at least one flasher unit for producing a turn signal having a constant repetition frequency, at least one lamp, connecting circuit for connecting said flasher unit direct to said lamp or through a resistor to said lamp, and a shunt circuit for bypassing through a resistor the lamp and the connecting circuit when the connecting circuit connects the flasher unit to the lamp through resistor. The load impedance of the flasher unit is therefore maintained constant so that the load current of the flasher unit stays constant whereby the repetition frequency of the turn signal stays substantially constant.

1 Claim, 12 Drawing Figures

LIGHTING SYSTEM FOR CONTROLLING LIGHTS OF MOTOR VEHICLE TO GLOW IN A REDUCED LUMINOUS INTENSITY DURING THE NIGHTTIME

This invention relates to lighting systems for motor vehicles and more particularly to a lighting system for controlling lights to glow at an increased luminous intensity during daytime as compared to nighttime.

Several lighting systems which energizes various lights to glow at an increased luminous intensity during daytime have been developed. The increase of the light intensity is normally accomplished by increasing an operation current flowing through the lights.

Such systems are, however, not fully acceptable for controlling winking or flashing lights such as turn indication and alarm lights because the repetition frequency of an output turn signal of a flasher unit is undesirably varied due to the variation of the operation current.

It is therefore an object of this invention to provide a lighting system for a motor vehicle which permits the flashing lights to flash at different luminous intensities.

Another object is to provide a lighting system for a motor vehicle which permits the flashing lights to flash at different luminous intensity while maintaining the rate of flashings constant.

In the drawings:

FIGS. 1 through 12 are diagrams illustrating various circuit arrangements of lighting systems according to this invention.

Referring now to FIG. 1, there is shown a circuit arrangement of a lighting system according to this invention, wherein a d.c. power source E has a negative terminal grounded and a positive terminal connected to a positive bus line 10. A stop lamp switch $SW_1$ has a stationary contact 11 connected through a fuse $F_1$ to the positive bus line 10 and movable contact 12. The switch $SW_1$ is closed, when a brake pedal (not shown) is depressed, to engage the contacts with each other. The movable contact 12 is connected through a line 13 to a stationary contact 14 of a normally closed relay switch $S_1$ of a relay RY, which contact 14 cooperates with a movable contact 15 which is connected through a line 16 to left and right stop lamps $S_L$ and $S_R$ which are in turn connected to an earth bus line 17. The relay switch $S_1$ is shunted by a resistor $R_1$. The relay RY has a relay coil CO having one terminal connected through a line 16 to a movable contact 19 of a switch $SW_3$. A stationary contact 20 is connected through a fuse $F_4$ to the bus line 10. The other terminal of the relay coil CO is connected through a line 21 to the earth bus line 17. The line 18 is connected through a line 22 to illuminating lamps T, P, L and B, such as, a tail lamp, a side lamp, a licence lamp and so on. These lamps are in turn connected to the earth bus line 17. A switch $SW_2$ has a stationary contact 23 connected to the bus line 10 and a movable contact 24 connected through a fuse $F_2$ to an input terminal of a turn signal generating unit 25. The switch $SW_2$ is actuated when the ignition switch (not shown) is actuated. An output terminal of the turn signal generating unit 25 is connected through a line 26 to a stationary contact 27 of a normally closed relay switch $S_{41}$ of a switch $SW_4$. The switch $SW_4$ is actuated in an emergency. A movable contact 28 is connected through a line 29 to a movable contact 30 of a changeover switch $SW_5$. The movable contact 30 engages with a stationary contact 31 when the motor vehicle on which this system is mounted turns to the left and with another stationary contact 32 when the motor vehicle turns to the right. The stationary contacts 31 and 32 are connected through lines 33 and 34 to movable contacts 35 and 36 of relay switch $S_{42}$ and $S_{43}$ of the switch $SW_4$. The movable contacts 35 and 36 cooperate with stationary contacts 37 and 38 which are connected through a line 39 to an output terminal of a hazard flashing signal generating unit 40. An input terminal of the hazard signal generator 40 is connected through a fuse $F_3$ to the bus line 10. The stationary contacts 31 and 32 are further connected through lines 41 and 42 to left and right turn indicator lamps $I_L$, $M_L$ and $F_L$, and $I_R$, $M_R$ and $F_R$, respectively. The stationary contacts 31 is connected through a line 43 to stationary contacts 45 and 47 of normally closed and normally open relay switches $S_2$ and $S_3$ of relay RY. The stationary contact 32 is connected through a line 44 to stationary contacts 46 and 48 of normally closed and normally open relay switches $S_4$ and $S_5$ of the relay RY. The relay switches $S_2$ and $S_4$ respectively have movable contacts 49 and 50 which are respectively connected through lines 51 and 52 to left and right rear turn indicator lamps $R_L$ and $R_R$ which are in turn connected to the earth bus line 17. The relay switches $S_2$ and $S_4$ are shunted by resistors $R_3$ and $R_4$, respectively. The movable contacts of relay switches $S_3$ and $S_5$ are respectively connected through resistors $R_2$ and $R_5$ and through the line 21 to the earth bus line 17.

When the switch $SW_3$ is open during the daytime, the relay coil CO of the relay RY is not energized so that the relay switches $S_1$, $S_2$, $S_3$, $S_4$ and $S_5$ are in normal condition. When, in this instance, the brake pedal is depressed and then the switch $SW_1$ closes, a current flows from the power source E through the relay switch $S_1$ and the lamps $S_L$ and $S_R$ to the earth bus line 17 with the result that the lamps $S_L$ and $S_R$ glow at a higher luminous intensity. When, on the other hand, the switch $SW_2$ is closed, the turn signal generating unit 25 is energized so as to produce a turn signal or impulse signal on the line 26. As long as the switch $SW_4$ is not operated, the turn signal is delivered through the relay switch $s_{41}$ to the movable contact 30. When, for example, the movable contact 30 is connected to the stationary contact 30, the turn signal is delivered through line 43, the relay switch $S_2$ and line 51 to the left rear turn indicator lamp $R_L$ which then winks in the higher luminous intensity. At the same time, the signal is applied through the line 41 to the indicator lamps $I_L$, $M_L$ and $F_L$ which then wink in accordance with the signal. When, on the contrary, the movable contact 30 engages with the contact 32, the signal is applied through the line 44, relay switch $S_4$ and line 52 to the right turn indicator lamp $R_R$ which then winks at a higher luminous intensity. The signal is, at the same time, delivered through the line 42 to the lamps $I_R$, $M_R$ and $F_R$ which then wink correspondingly. When the switch $SW_4$ is operated in emergency, the relay switch $S_{41}$ opens and the relay switches $S_{42}$ and $S_{43}$ close respectively, so that, the hazard signal from the hazard signal generator 40 is delivered through the line 39, relay switches $S_{42}$ and $S_{43}$ to the contacts 31 and 32. The hazard signal is then applied to the lamps $I_L$, $M_L$, $F_L$, $R_L$, $R_R$, $I_R$, $M_R$ and $F_R$ via the same lines as the turn signal.

When the switch $SW_3$ is closed when it is dark, the relay coil CO is energized by a current passed through the switch $SW_3$, whereby the relay switches $S_1$, $S_2$, $S_3$, and $S_4$ and $S_5$ are respectively actuated. Since, in this instance, the relay switches $S_1$, $S_2$ and $S_4$ are open, the resistors $R_1$, $R_3$ and $R_4$ are inserted in the circuit passing therethrough currents to be supplied to the corresponding lamps, so that, the lamps glow in a reduced lunimous intensity when energized. On the other hand, the relay switches $S_3$ and $S_5$ are, in this instance, closed thereby to respectively complete two shunt circuits each including resistors $R_3$ and $R_5$ and bypassing the two circuits of the resistor $R_3$ and lamp $R_L$, and the resistor $R_4$ and lamp $R_R$. Through the completion of the shunt circuits, the total resistance of the load circuits of the turn signal generator unit 25 is substantially maintained so that the current flowing through the turn signal generator unit 25 is substantially maintained. Since the repetition frequency of the turn signal or the hazard signal is normally governed by the intensity of the current passing therethrough, the repetition frequency is not affected by reducing the luminous intensity of the load lamps.

Figure 2:
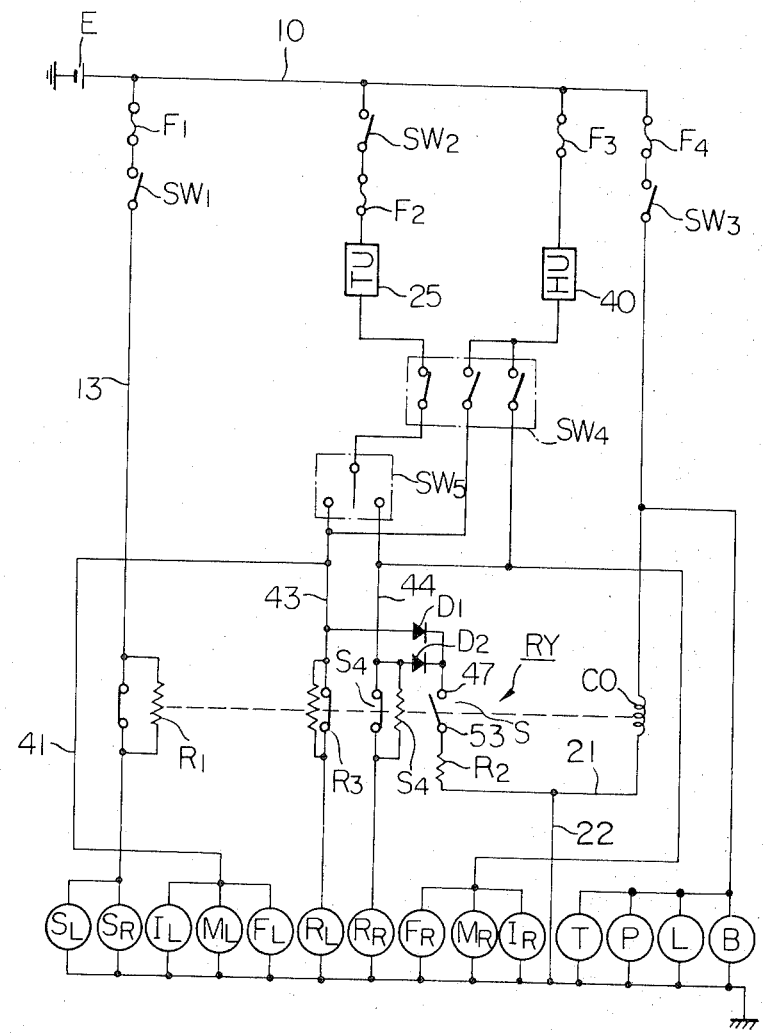

Referring now to FIG. 2, there is shown another circuit arrangement according to this invention, which includes the same element as the circuit of FIG. 1, which are indicated by the same alphanumeric references. This circuit, however, includes a shunt circuit having two diodes $D_1$ and $D_2$ anode terminals of which are respectively connected to the lines 43 and 44. Cathode terminals of the diodes $D_1$ and $D_2$ are connected to the stationary contact 47 of the relay switch $S_4$.

The operation of this circuit is identically the same as the circuit of FIG. 1.

Figure 3:
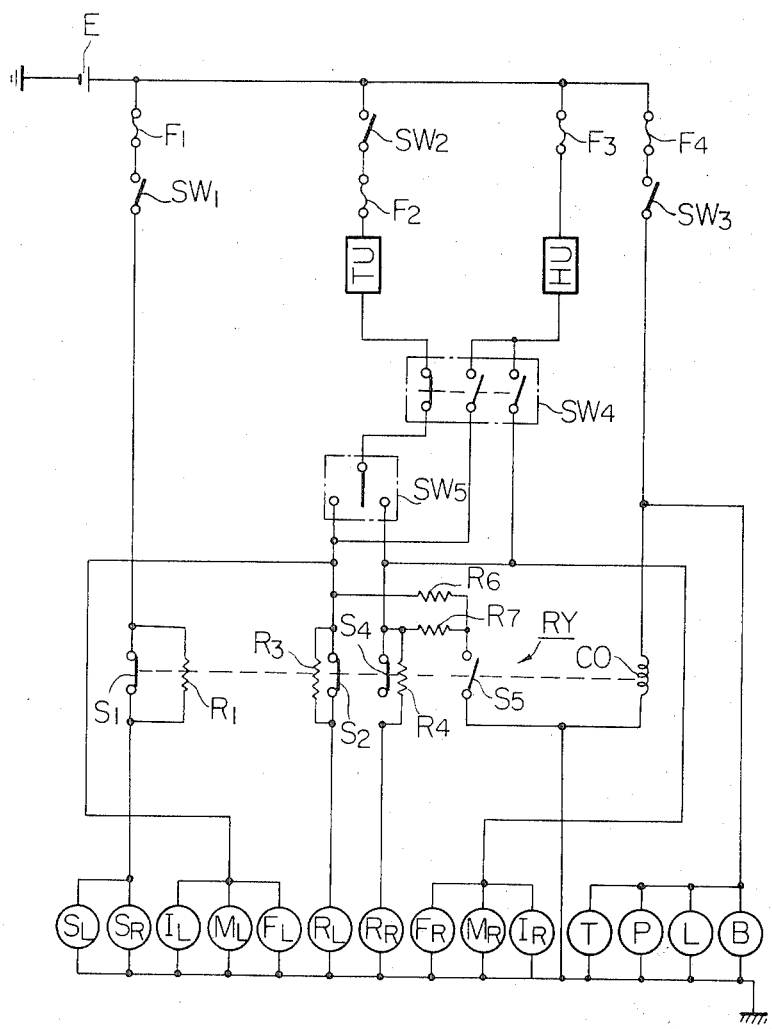

In FIG. 3, still another circuit arrangement is illustrated, which includes the same elements as the circuit of FIG. 2. However, the diodes $D_1$ and $D_2$ are respectively replaced by resistors $R_6$ and $R_7$. The operation of this circuit is identically the same as the circuit of FIG. 2.

Figure 4:
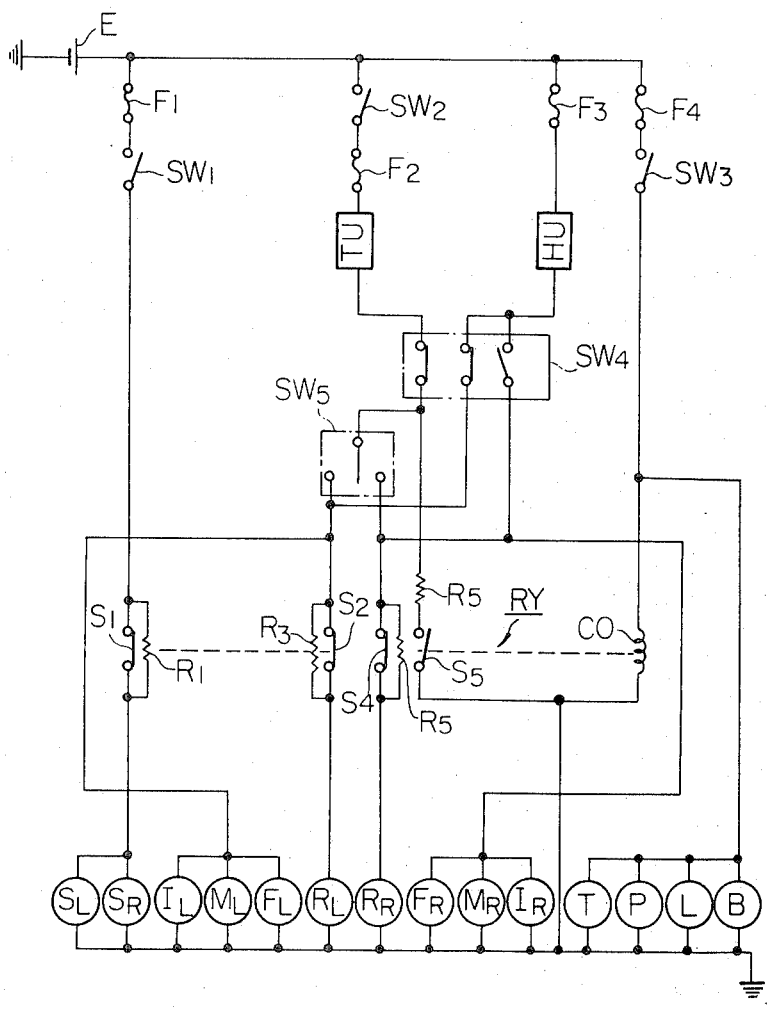

In FIG. 4, still another circuit arrangement is shown, which includes the same element as the circuit of FIG. 3. However, the resistor $R_5$ interconnecting the movable contact 28 of the relay switch $S_{41}$ of the switch $SW_4$ and the stationary contact of relay switch $S_4$. The operation of this circuit is the same as that of FIG. 3 and therefore the explanation of the operation is omitted.

Figure 5:
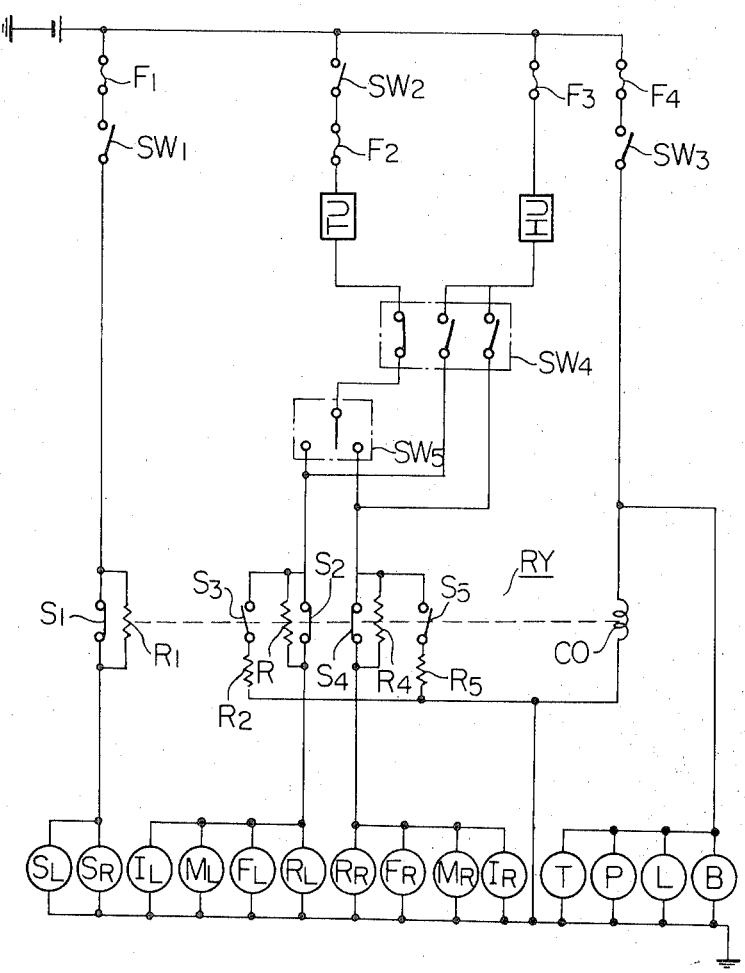

In FIG. 5, still another circuit arrangement is illustrated, which includes the same element as that of FIG. 1. The indicator direction indicator lamps $I_L$, $M_L$ and $F_L$, and $I_R$, $M_R$ and $F_R$ are connected to the lines including relay switches $S_2$ and $S_4$ shunted by resistors $R_3$ and $R_4$. Therefore, these lamps, in operation, glow in the same manner as the lamps $R_L$ and $R_R$.

Figure 6:
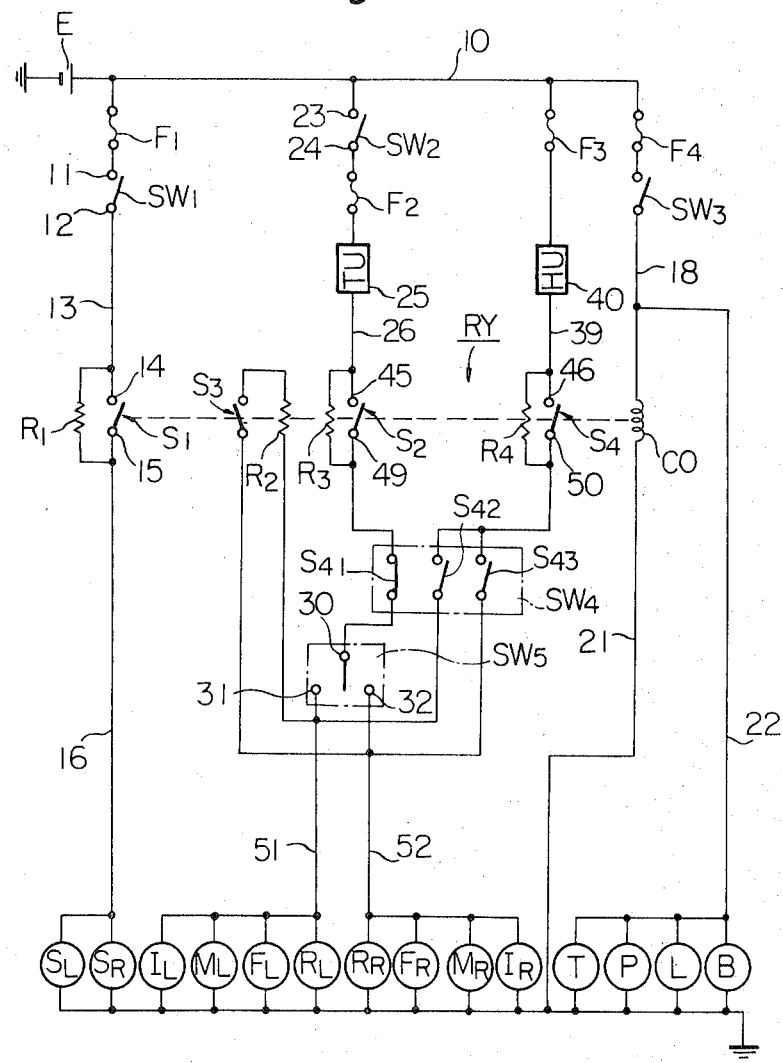

In this instance, it is to be noted that the hazard flasher unit 40 is usually constructed to have such a high inner impedance that the repetition frequency is not affected by the variation of its load current. The shunt circuit corresponding to the hazard flasher unit may be negligible if desired. In FIG. 6, still another circuit arrangement of this invention is shown, wherein the shunt circuit corresponding to the hazard flasher unit 40 is omitted. This circuit comprises the same element as that of FIG. 1 which are designated by the same alphanumeric references. However, this circuit is differentiated from that of the preceding circuits in that the relay switch $S_3$ shunted by the resistor $R_3$ is inserted between the turn signal generator unit 25 and the relay switch $S_{41}$ of the switch $SW_4$ and the relay switch $S_4$ is inserted between the hazard flasher unit 40 and the relay switches $S_{42}$ and $S_{43}$. The stationary contacts 31 and 32 of the switch $SW_5$ through lines 51 and 52 to the direction indicator lamps $I_L$, $M_L$, $F_L$, $I_R$, $M_R$ and $F_R$. The stationary contacts 31 and 32 are interconnected with each other by a series circuit of the relay switch $S_3$ and the resistor $R_2$.

When, in operation, the switch $SW_3$ is closed, the relay coil CO is energized by a current through the switch $SW_4$ thereby to open the relay switch $S_2$ and close the relay switch $S_3$. In this instance, when the movable contact 30 is connected to the stationary contact 31 the turn signal passed through the resistor $R_3$ is applied through the line 51 to the direction indicator lamps $I_L$, $M_L$, $F_L$ and $R_L$ which then wink respectively. These lamps are on the other hand bypassed by the resistor $R_2$, the relay switch $S_3$, and the right direction indicator lamps $I_R$, $M_R$, $F_R$ and $R_R$ with the result that the load resistance is decreased thereby to maintain the load current of the turn signal generator unit 25. It should be noted that the resistance of the resistor $R_2$ is suitably selected so as to prevent the right direction indicator lamps from glowing. When, on the contrary, the movable contact 30 of the switch $SW_5$ is connected to the stationary contact 31, the lamps $I_R$, $M_R$, $F_R$ and $R_R$ are energized by the turn signal while they are by-passed by the circuit of the resistor $R_2$, the relay switch $S_3$ and the left direction indicator lamps.

Figure 7:
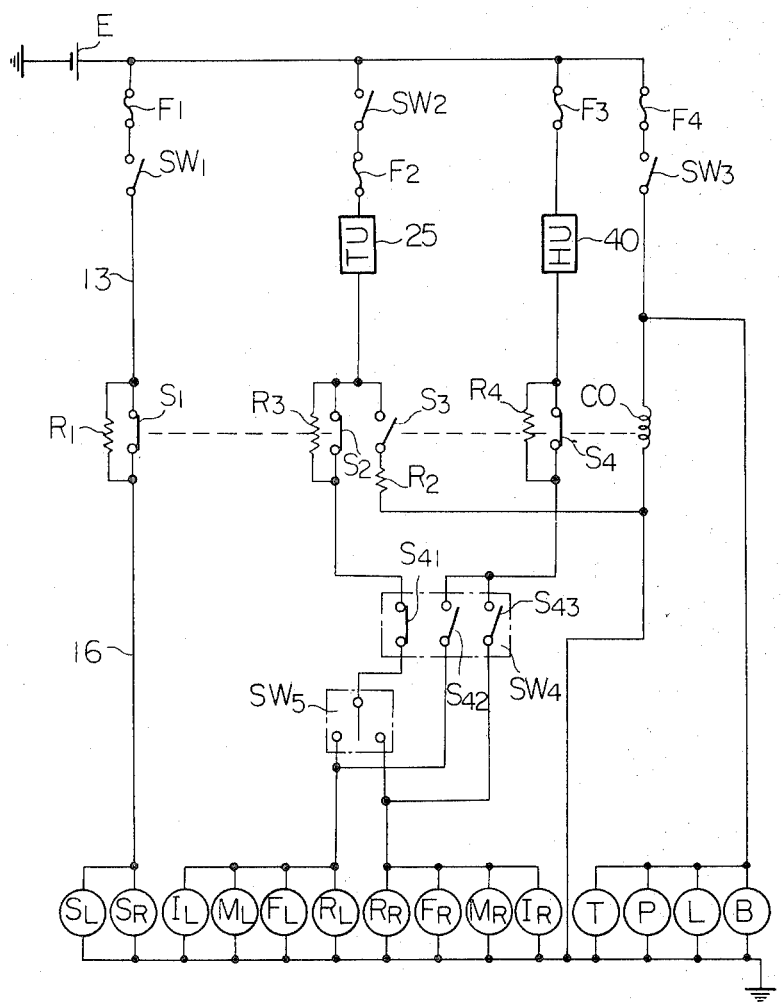

In FIG. 7, a modified form of the circuit of FIG. 6 is illustrated, wherein the relay switch $S_3$ and the resistor $R_2$ interconnects the output of the turn signal generating unit 25 and the earth bus line.

When, in operation, the switch $SW_3$ is closed, the relay coil CO is energized thereby to actuate the relay switches $S_1$, $S_2$, $S_3$ and $S_4$. In this instance, the resistor $R_3$ is inserted in the circuit in series with the load lamp circuit and the resistor $R_2$ is connected in parallel with the load lamp circuit whereby a current passing through the load lamp circuit is decreased while the load current of the turn signal generator unit is maintained.

Figure 8:
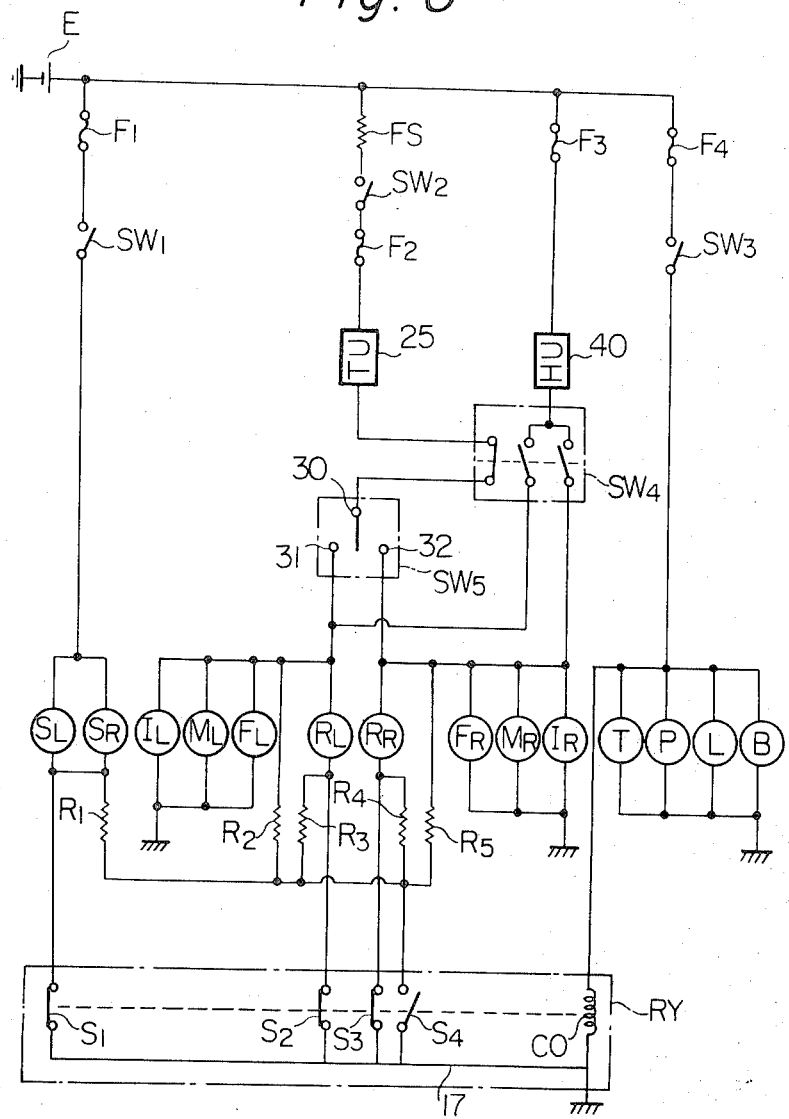

In FIG. 8, still another circuit arrangement of a lighting system according to this invention is shown, wherein the same elements as the circuits of FIGS. 1 to 7 are designated by the same references. This circuit is characterized in that the relay switches $S_1$, $S_2$, $S_3$ and $S_4$ are inserted between the lamp circuits and the earth bus line 17. Being thus constructed, it is possible to prevent a flow of such a large current as to damage the contacts.

When, in operation, the switch $SW_3$ is open, the relay coil CO of the relay RY is not energized whereby the relay switches $S_1$, $S_2$, $S_3$ and $S_4$ are all in normal positions. When, in this instance, the brake pedal is depressed and the switch $SW_1$ is closed, a current flows through the switch $SW_1$, stop lamps $S_L$ and $S_R$ and the relay switch $S_1$ to the earth bus line 17 thereby to light the lamps $S_L$ and $S_R$. When, on the other hand, the ignition switch $SW_2$ is closed a voltage is applied through a resistor FS, the switch $SW_2$ and the fuse $F_2$ to the input terminal of the turn signal generator unit 25 which then produces the turn signal on its output. When the switch $SW_4$ is not actuated and the movable contact 30 of the switch $SW_5$, is connected to the contact 31, the turn signal is applied the lamps $I_L$, $M_L$, and $F_L$ which are in turn grounded. The turn signal is also applied to one terminal the lamp $R_L$ the other terminal of which is connected through the relay switch $S_2$ to the bus line 17. When the movable contact 30 is connected to the contact 32, the lamps $I_R$, $M_R$, $F_R$ and $R_R$ are energized by the turn signal in the same manner as described above. If, in an emergency the switch $SW_4$ is actuated the hazard flasher signal is applied to the left and right direction indicator lamps.

When the switch $SW_3$ is closed during the nighttime, the lamps T, P, L and B are energized to glow and the relay coil CO is also energized to actuate the relay switches $S_1$, $S_2$, $S_3$ and $S_4$. In this instance, the resistor $R_1$ is inserted in the circuit in series with the lamps $S_L$ and $S_R$, whereby the lamps $S_L$ and $S_R$ glows in a reduced luminous intensity, when energized. The resistors $R_3$ and $R_4$ are respectively serially connected to the lamps $R_L$ and $R_R$ which then wink in a reduced luminous intensity when applied with the turn signal. In this instance, the resistors $R_2$ and $R_5$ bypass the lamps $R_L$ and $R_R$ so that the resistance of the lamp circuit is maintained. The load currents of the units 25 and 40 are therefore maintained.

Figure 9:
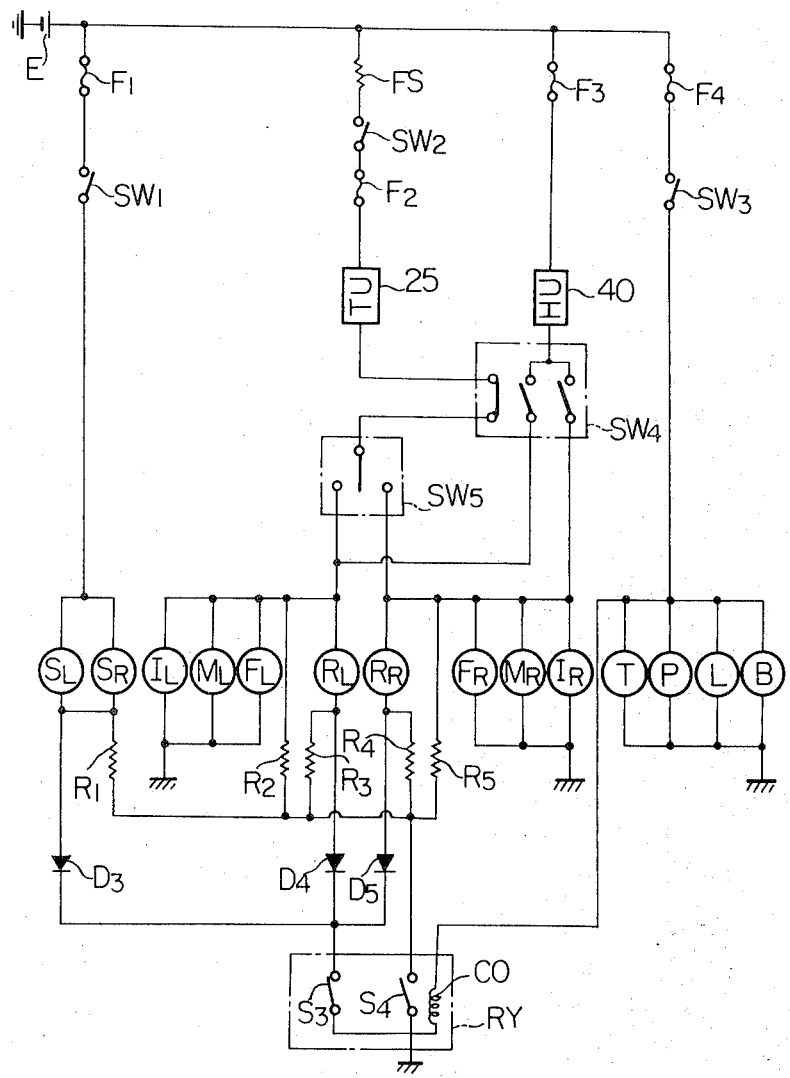

In FIG. 9, still another circuit arrangement of a system according to this invention is illustrated, which comprises the same construction as that of FIG. 8 except that the relay switches $S_1$ and $S_2$ are omitted and the lamps $S_L$ and $S_R$, $R_L$ and $R_R$ are respectively connected through diodes $D_3$, $D_4$ and $D_5$ to the relay switch $S_3$. The operation of this circuit is identically the same as that of FIG. 8.

Figure 10:
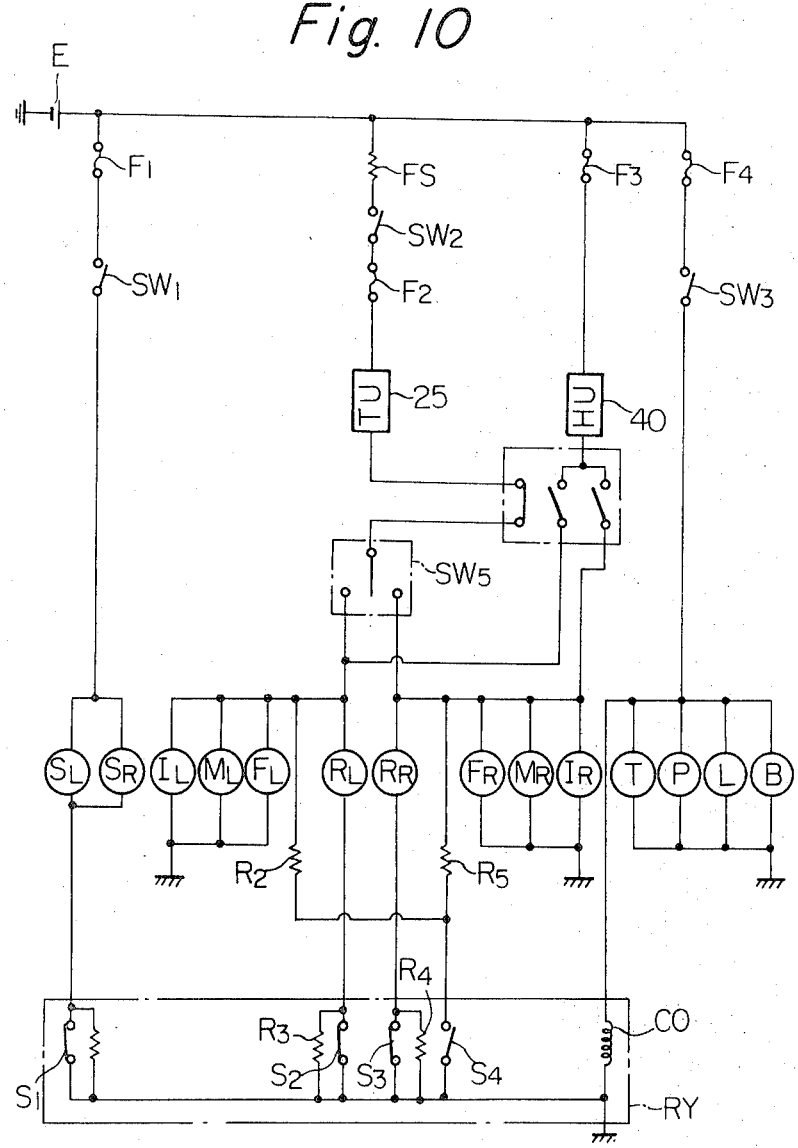

In FIG. 10, still another circuit arrangement of a system according to this invention is shown, which comprises the same construction as that of FIG. 8 except that the resistors $R_3$ and $R_4$ connected across the relay switches $S_2$ and $S_3$, respectively. The operation of this circuit is the same as that of the circuit of FIG. 8.

Figure 11:
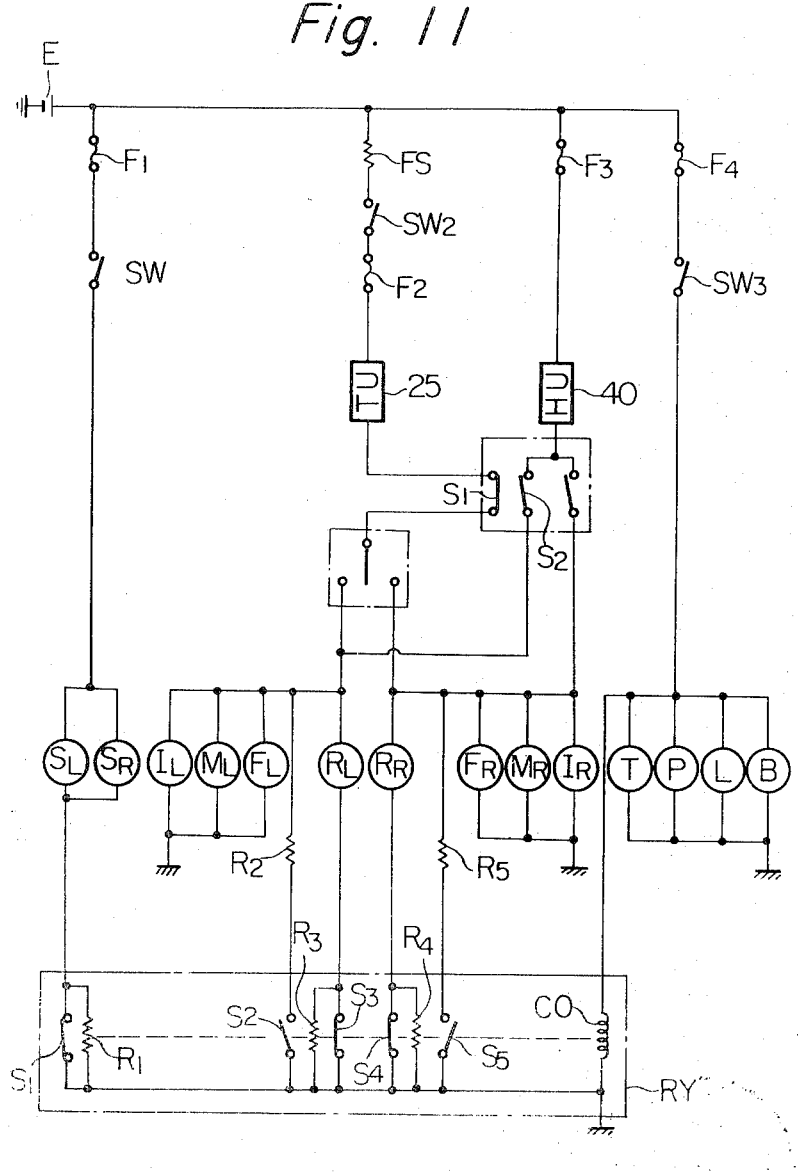

In FIG. 11, still another circuit arrangement of a system according to this invention is shown, which comprises the same construction as that of FIG. 10 except that a relay switch $S_5$ is provided is series with the resistor $R_5$. The operation of this circuit is the same as that of FIG. 10.

Figure 12:
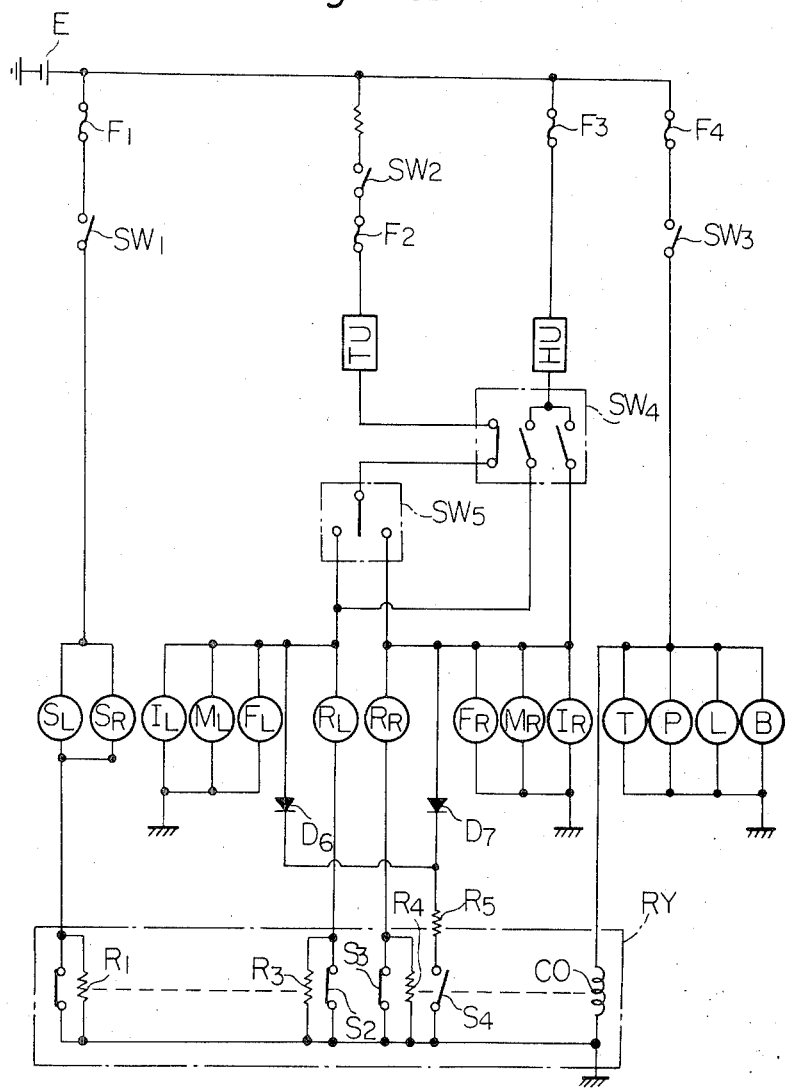

In FIG. 12, still another circuit arrangement according to this invention is illustrated which is modified from that of FIG. 10 through providing diodes $D_6$ and $D_7$ and neglecting the resistor $R_2$. The operation of this circuit is the same as that of the circuit of FIG. 10.

It will be understood that this invention is not to be limited to the exact construction shown and described and that various changes and modifications may be made without departing from the spirit and scope of this invention, as defined in the appended claims.

What is claimed is:

1. A lighting system for a motor vehicle connected between a first terminal of an electrical energy source and a second terminal of this source which is grounded, which comprises:
   at least one flasher unit with an input terminal connected to said first terminal for producing a flashing signal having a constant repetition frequency;
   at least one change-over switch having a movable contact connected to the output terminal of said flasher unit and a pair of stationary contacts;
   at least one first lamp having one terminal connected to one of said stationary contacts;
   at least one second lamp having one terminal connected to the other of said stationary contacts;
   a relay having a relay coil and a plurality of relay switches, said coil being connected, in series with another switch, between the terminals of the energy source.
   a first normally closed relay switch in said relay adapted to be actuated during the night time when said another switch is closed and having one contact connected to the other terminal of said first lamp and the other contact connected to the ground;
   a first resistor bypassing said first normally closed relay switch;
   a second normally closed relay switch in said relay adapted to be actuated when said coil is energized during the night time and having one contact connected to the other terminal of said second lamp and the other contact connected to the ground;
   a second resistor bypassing said second normally closed relay switch;
   a first rectifier having its anode connected to said one terminal of said first lamp;
   a second rectifier having its anode connected to said one terminal of said second lamp;
   a third resistor having one terminal connected to both cathodes of said first and second rectifiers; and
   a normally open relay switch in said relay having one contact connected to the other terminal of said third resistor and the other contact connected to the ground, said normally open relay switch adapted to be actuated when said coil is energized.

* * * * *